US005350469A

United States Patent [19]

Lenhardt et al.

[11] Patent Number: 5,350,469

[45] Date of Patent: Sep. 27, 1994

[54] PROCESS AND APPARATUS FOR ASSEMBLING INSULATING GLASS PANES FILLED WITH A GAS OTHER THAN AIR

[75] Inventors: Karl Lenhardt, Neuhausen-Hamberg; Uwe Bogner, Pforzheim-Huchenfeld, both of Fed. Rep. of Germany

[73] Assignee: Lenhardt Maschinenbau GmbH, Neuhausen-Hamberg, Fed. Rep. of Germany

[21] Appl. No.: 965,259

[22] PCT Filed: Jul. 12, 1991

[86] PCT No.: PCT/EP91/01307

§ 371 Date: Jan. 20, 1993

§ 102(e) Date: Jan. 20, 1993

[87] PCT Pub. No.: WO92/01137

PCT Pub. Date: Jan. 23, 1992

[30] Foreign Application Priority Data

Jul. 13, 1990 [DE] Fed. Rep. of Germany ....... 4022185

[51] Int. Cl.⁵ ........................ B32B 17/06; B32B 31/16

[52] U.S. Cl. .................................. 156/102; 156/105; 156/107; 156/109; 156/163; 156/583.91; 156/556

[58] Field of Search ................. 156/99, 102, 103, 105, 156/107, 109, 163, 583.91, 539, 578, 556

[56] References Cited

U.S. PATENT DOCUMENTS

| | | | |
|---|---|---|---|
| 3,842,567 | 10/1974 | Zwart et al. | 156/102 X |
| 4,248,656 | 2/1981 | Hofmann | 156/107 X |
| 4,356,614 | 11/1982 | Käuferle et al. | 156/109 X |
| 4,369,084 | 1/1983 | Lisec | 156/109 X |
| 4,911,779 | 3/1990 | Lenhardt | 156/109 X |

FOREIGN PATENT DOCUMENTS

| | | |
|---|---|---|
| 0056762 | 7/1982 | European Pat. Off. . |
| 8911021 | 11/1989 | PCT Int'l Appl. . |
| 2099057 | 12/1982 | United Kingdom . |

*Primary Examiner*—Michael W. Ball
*Assistant Examiner*—Francis J. Lorin
*Attorney, Agent, or Firm*—Dvorak and Traub

[57] ABSTRACT

To fill insulating glass panes with a heavy gas, one of the glass plates (40) of which the insulating glass pane is formed is initially only partly joined to the other glass plate (42) during assembly and to that end is flexed along one edge so that a gap is temporarily left between the glass plate (40) and the spacer (41) and a heavy gas can be introduced through that gap to fill the interior space of the insulating gas pane.

33 Claims, 6 Drawing Sheets

PROCESS AND APPARATUS FOR ASSEMBLING INSULATING GLASS PANES FILLED WITH A GAS OTHER THAN AIR

TECHNICAL FIELD

This invention relates to a process of assembling insulating glass panes, wherein an interior space is provided between pairs of glass plates, which are spaced apart and adhesively joined along their edges by a framelike spacer and which during their assembling are in contact on their outside surfaces with positioning surfaces, and wherein said interior space are filled with a gas other than air, in that at least one of the glass plates is elastically flexed along an edge of the glass plate, the spacer is attached to one of the glass plates (hereinafter called the "first" glass plate) before or during or after the flexing of one of the glass plates, the spacer is attached to the other glass plate (hereinafter called the "second" glass plate) while the flexing is maintained to keep open an access opening to the interior space between the glass plates, the gas is admitted to the interior space through the access opening thus provided, and the access opening is displaced in that the resilient flexing is eliminated, and to an apparatus for assembling insulating glass panes wherein an interior space is provided between pairs of glass plates, which are spaced apart and adhesively joined along their edges by a framelike spacer and wherein said interior space is filled with a gas other than air, comprising backing means for supporting and positioning glass plates, retaining means, which are parallel to the backing means and arranged at a variable distance therefrom and serve to retain and position one of the glass plates at a distance from the other glass plate, wherein either the backing means or the retaining means or both define a positioning surface, which is intended to contact the outside surface of one glass plate and in which the forward surface of an elongate suction device is disposed, which is directed toward the glass plate, and means for supplying the gas.

BACKGROUND OF THE INVENTION

Such a process and such an apparatus are described in WO 89/11021. In the known process two glass plates, which have been assembled to form an insulating glass pane, are temporarily provided with an access opening to the interior space between the glass plates in that one of the glass plates is resiliently flexed before or after the assembling of the glass plates. To that end the known apparatus is provided with vacuum cups, which are arranged in a vertical striplike recess in a wall and are adapted to be extended as far as to the forward surface of the wall and to be retracted parallel to themselves so as to be disposed some millimeters behind the forward surface of the wall. The wall itself is provided with holes, which are regularly distributed over the surface of the wall and through which air can also be sucked, to retain and position the glass plate on the wall. The glass plate which is gripped on both sides because air is sucked through the holes in the wall is caused to bulge in a strip-like area by the action of the suction cups in the striplike recess in the wall and high flexural stresses are thus produced in the glass because the sense of curvature is reversed several times in the flexing range. Owing to the high flexural stress it is difficult to flex thick glass plates and any microcracks existing in the glass plate may cause the glass plate to break whereas such cracks would not become apparent unless the glass plate was flexed. In accordance with WO 89/11021 the stresses can locally be alleviated in that the wall has a curved surface in a region which adjoins the recess on both sides so that there is a gradual transition from the planar portion of the wall into its recess and the steepness of the curvature at the edge of the recess can be decreased although the sense of curvature of the glass plate is still reversed several times.

In the prior art it has also already been proposed to flex the glass plate along one of its edges. But it has not been stated what apparatus is to be used for that purpose.

SUMMARY OF THE INVENTION

It is an object of the invention to provide a process and an apparatus by which glass plates can be flexed during the assembling of insulating glass panes in such a manner that a smaller force is required and lower flexural stresses are produced in the glass. Such flexing is effected to provide an access opening, which leads to the interior space of the insulating glass pane and through which a gas other than air can be supplied. The lower flexural stresses are mainly desired to reduce the risk of fracture and to facilitate the flexing of relatively thick glass plates.

That object is accomplished by a process having the features recited in claim 1 or the features recited in claim 2. An apparatus which is particularly desirable for carrying out the process in accordance with the invention is the subject matter of claim 10. Desirable further features of the invention are covered by the dependent claims.

The process according to claim 2 differs from the process according to claim 1 only in the sequence of the steps: In the process according to claim 1 the glass plate is flexed before the glass plates are assembled. In the process according to claim 2 the glass plates are flexed after the glass plates have been assembled, i.e., the glass plates are initially assembled with an interposed spacer and a glass plate is subsequently flexed so that it is detached from the spacer in a certain region.

It is new and particularly important that in the process in accordance with the invention the glass plate to be flexed is flexed together with the positioning surface which contacts the glass plate. In combination with the fact that the glass plate is not flexed in a middle region but is flexed along one of its edges and parallel thereto, the glass plate is only concave in its flexed portion on its outside surface so that the sense of curvature is no longer reversed and, as a result, the flexural stress is much greatly reduced; in a comparison with the prior art, openings having comparable widths can be obtained in conjunction with flexural stresses which are only one-fourth of those which are otherwise required. That success is substantially promoted by the fact that there will be no kink in the positioning surface that is contacted by the glass plate as it is flexed; this is due to the fact that the positioning surface is flexed together with the glass plate so that the positioning surface and the glass plate continuously hug each other also in the flexing region being flexed.

As will be shown with reference to an illustrative embodiment, the process in accordance with the invention can be carried out in a conventional production line for insulating glass, provided that that production line is altered with a relatively low expenditure only adjacent to the assembling station. Insulating glass panes filled with a heavy gas and insulating glass panes filled with air can be made in any desired sequence in one and the same production line.

Spacers are available which are so flexible that they can be flexed together with a glass plate. But the glass plate is preferably flexed before it is joined to the spacer so that an access to the interior space of the insulating glass plate will not depend on whether and to what extent the spacer which is employed can be flexed. That practice will be particularly recommendable in the manufacture of insulating glass which is adhesively joined at its edge and is made with the aid of spacers which consist of tubular profiled metal bars and are provided on both side faces with an adhesive, by means of which they adhesively join the two glass plates. On principle, both glass plates may be flexed to provide a larger access opening to the interior space of the insulating glass pane. But it has been found that the higher expenditure involved in such practice is not required and that it is sufficient to flex only one of the glass plates. In that case it is best to place the spacer on that glass plate which is not to be flexed. This will afford the advantage that the spacer will not be subjected to flexural stress and will be retained and supported throughout its periphery. Thereafter a glass plate is contacted with the spacer and the flexing will necessarily keep open an opening between the flexed glass plate and the spacer.

Alternatively, both glass plates may initially be entirely contacted with the spacer and one of the two glass plates may then be flexed to detach it in part from the spacer if that is permitted by the adhesive employed. This will be permitted by butyl rubber adhesives, provided that they have not excessively been compressed.

On principle, the insulating glass plate may be filled in a horizontal orientation when one of the glass plates lies on a table and the second is disposed over that one glass plate, and is retained, e.g., by suction means. But the insulating glass pane is preferably filled when it stands on edge and in that case one of the glass plates is flexed along one of its edges extending from bottom to top; in that case the heavy gas will desirably be introduced close to the lower corner of the insulating glass pane and will be permitted to rise in the space between the two glass plates so that the air will be upwardly displaced. In that case the open gap is suitably covered at the horizontal bottom edge and at that edge of the insulating glass pane which extends from bottom to top and the air is permitted to escape through the opening which remains at the top horizontal edge.

In the apparatus which is proposed for carrying out the process in accordance with the invention the two glass plates to be assembled to form the insulating glass pane are positioned to be parallel and congruent to each other and are assembled and, in accordance with the invention, one or both of the glass plates and preferably only one of the glass plates is flexed at its edge so that a heavy gas can be introduced. When the heavy gas has been introduced, the flexing is discontinued and the glass plates are adhesively joined to the spacer throughout their periphery. For that purpose the apparatus comprises means for supporting one of the glass plates and retaining means, which are parallel to and disposed at a variable distance from the supporting means and serve to retain the other glass plate. Insulating glass plates are assembled in a horizontal or upright attitude. In both cases there will be a lower glass plate, which is supported by the supporting means, and an upper glass plate, which is retained by the retaining means. The supporting means may consist of a set of rollers, which are known in that art, and preferably consists of an air cushion wall, on which a glass plate can be moved as it floats on an air cushion and can be fixed after a change from blowing to sucking. The retaining means might be a frame with clips, which engage the glass plate at its edge, and with positioning elements, which define a positioning surface. Just as the supporting means, the retaining means preferably consist of a wall, which is preferably formed with bores, through which air is sucked so that a glass plate can be sucked and can be retained and positioned on the wall.

One of these two walls which form a positioning surface for a glass plate, is combined with an elongate suction device, the forward surface of which is disposed in a resiliently deflectable portion of the positioning surface. It will depend on practical considerations whether that portion belongs to the supporting means or to the retaining means. The resiliently deflectable portion is preferably disposed at the edge of the retaining means or supporting means so that the retaining means or supporting means are terminated at that deflectable portion. Alternatively, the deflectable portion might be disposed in the middle of relatively large supporting means or retaining means and in that case the glass plate to be flexed will so be positioned that it contacts only the resiliently deflectable portion and that portion of the positioning surface which adjoins the deflectable portion on one side and at which the deflectable portion is gripped on one side.

The elongate suction device preferably comprises a row of a plurality of suction cups, which directly adjoin each other and can individually be activated so that the suction force for flexing can optimally be produced and adapted to the size of the glass plate to be flexed. In an apparatus in which the glass plates are assembled in an upright attitude and lean on the supporting means as the glass plates are conveyed in and out, the row of suction cups preferably extends at right angles to the direction of conveyance so that the glass plate to be flexed is flexed along one of its edges extending from bottom to top, preferably along the leading edge.

Because in accordance with the invention an elongate opening is provided between the spacer and the glass plate to permit the gas to be introduced and the gas-air mixture to be displaced, the gas is desirably introduced by means of a nozzle, which has an elongate orifice, which is engaged with the edge of the glass plates, or with the edge of one glass plate and with the spacer and is sealed in a suitable manner so that a maximum efficiency will be achieved. The gas-air mixture being displaced can be sucked through a suction nozzle, which may also be engaged with the edge of the glass plate or with the edge of one glass plate and with the spacer. Besides, a covering element is provided between the region that contains the feeding nozzle and the region in which the gas-air mixture being displaced escapes so that gas losses will be avoided. The feeding nozzle and the suction nozzle are preferably integrated in a common covering element, which covers the edge of the insulating gas pane throughout the edge along which the flexing is to be effected. That covering element preferably comprises a row of suction openings, which begin near the filling nozzle and which are adapted to be activated individually or in groups. In that case it will be possible even with insulating glass panes which differ in size to suck through only one suction opening or through a group of suction openings and that opening or those openings may be disposed outside the edge of the insulating glass pane but close to its corner.

For handling upright insulating glass panes it will be recommendable to provide a short covering bar, which is pivoted to the covering element at its bottom end and which is adapted to be pivotally moved to the lower-edge of the insulating glass pane after the covering element has been engaged with the flexed glass edge. In that case the wedge-shaped gap existing there will be covered.

The suction device preferably comprises a sheet metal element, which is formed with suction openings and which is gripped on one side at the delivery-side end of the retaining means and which on its forward surface carries a layer of an elastomeric material. Such a sheet metal element is sufficiently flexible and the elastomeric layer, which serves to seal the suction cup and to ensure a gentle contact with the glass surface, can easily be flexed together with the sheet metal element. Flexing may be effected by pushing and/or pressure-applying means, which act on the rear surface of the sheet metal element, preferably close to the delivery edge of the sheet metal element. The pushing and/or pressure-applying means should preferably act by means of an articulated joint so that the bend lines will not be distorted by a severe action. The material and the thickness of the sheet metal element are preferably so selected that its flexing behavior is adapted to that of the glass plate and that both of them can be flexed with curvatures which agree with each other as closely as possible. Experience has shown that very good results will be produced with a sheet element having a thickness of 4 to 5 mm.

MODES OF CARRYING OUT THE INVENTION

An illustrative embodiment of the apparatus in accordance with the invention is schematically illustrated in the accompanying drawings.

Figure 1:
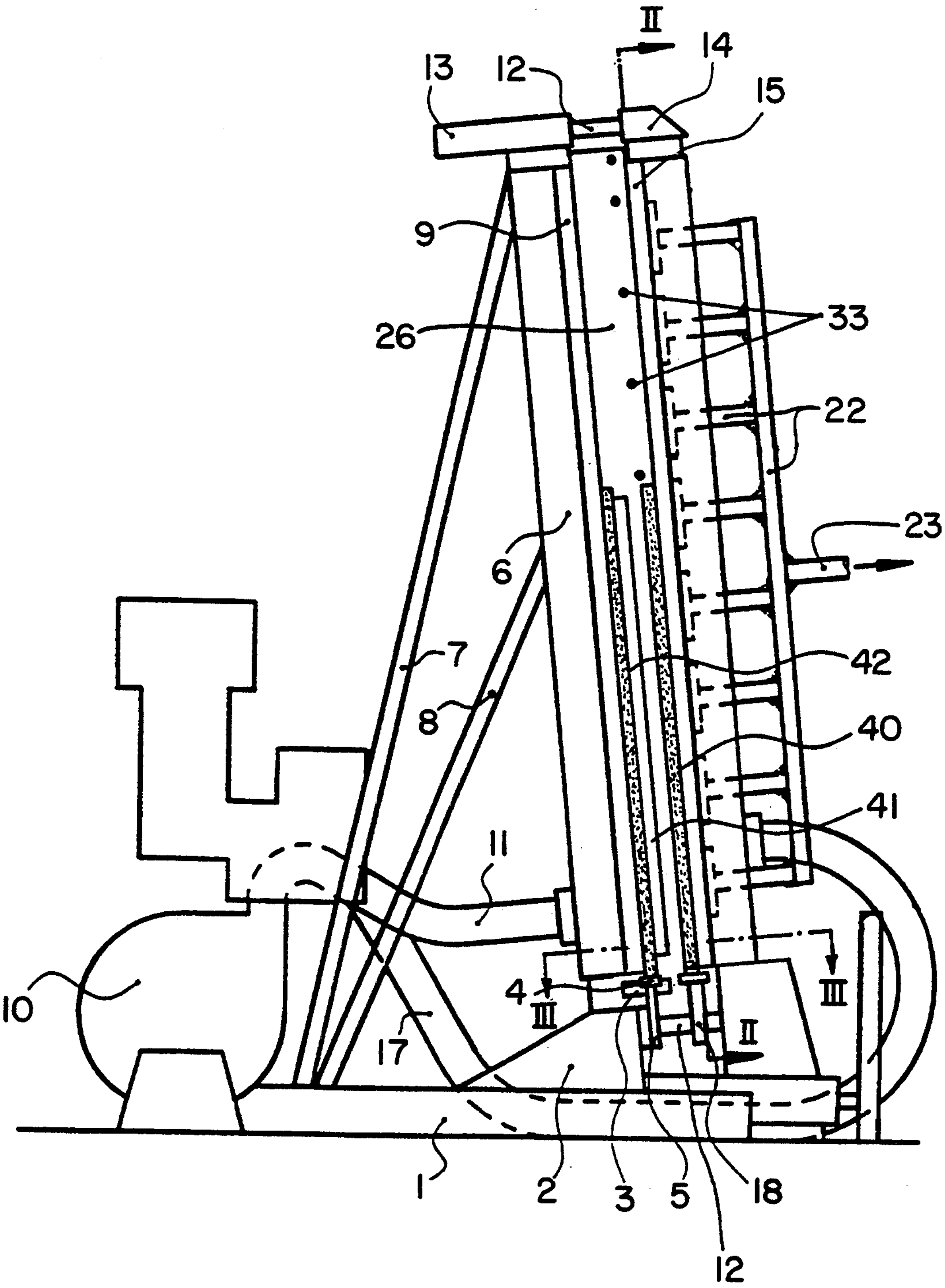
FIG. 1 is a side elevation showing the apparatus.
Figure 2:
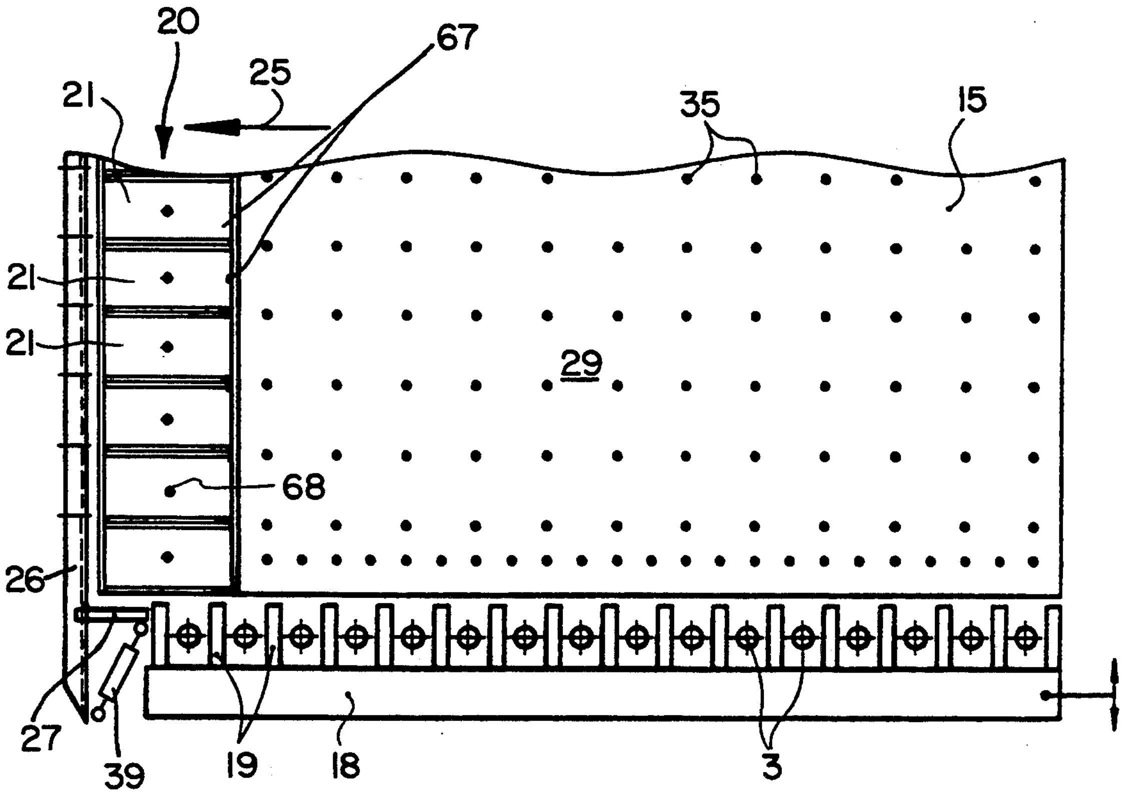
FIG. 2 is a schematic sectional view taken on line II—II and showing a portion of the apparatus.

It is apparent from FIGS. 1 and 2 that the apparatus comprises an underframe 1 and on top thereof a pedestal 2, which carries a horizontally conveying conveyor, which consists of a series of synchronously driven rollers 3. A support 4 is provided between any two adjacent rollers 3. The series of supports 4 are provided on a lifting beam 5, which is adjustable up and down so that the supports 4 are reciprocable between a position in which they protrude above the rollers 3 and a position in which they are below the top of the rollers 3.

A backing wall 6 is provided above the rollers 3 and rests on one side on the pedestal 2 and by struts 7 and 8, which rest on the underframe 1, is supported in a position in which the wall 6 is rearwardly inclined by about 6° from the vertical. The backing wall 6 consists of an air cushion wall, i.e., it consists of a plate 9, in which a number of bores are distributed, which are supplied through a line 11 with compressed air from a fan 10. The forward surface of the backing wall 6 constitutes a first positioning surface 28 for a glass plate 40 and 42.

Close to the four corners of the backing wall 6, four rods 12 extending at right angles to the backing wall 6 are provided on the frame of the backing wall 6 and are adapted to be reciprocated by a fluid-operable cylinder 13 at right angles to the backing wall 6. Instead of the cylinder 13, a screw might be used. At their forward ends, the rods 12 carry retaining means 14, to which a frame is secured, which is provided with a wall 15, which is parallel to the backing wall 6 and the distance of which from the backing wall 6 can be changed by an operation of the fluid-operable cylinders 13. The wall 15 consists also of an air cushion wall and for that reason is supplied with compressed air from the fan 10 through another line 17. Just as the backing wall 6 the wall 15 is formed with a number of bores 35, which are distributed over the surface of the wall 15 and throuch which air from the fan can be discharged or air can be sucked by the fan. The forward surface of the wall 15 constitutes a second positioning surface for a glass plate 40. Another lifting beam 18 provided with a plurality of supports 19 is disposed below the wall 15.

A striplike suction device 20, which extends from the bottom edge to the top edge of the wall 15, is provided at that end of the wall 15 which is the delivery-side end with respect to the direction of conveyance. The suction device 20 consists of a row of superposed suction cups 21, which are connected by piping 22 and 23 to a vacuum source, not shown, and are adapted to be activated individually or in groups.

The suction device 20 is succeeded in the direction of conveyance 25 by a covering element 26, which is adapted to be moved into and out of the path of conveyance for an insulating glass pane.

Figure 3:
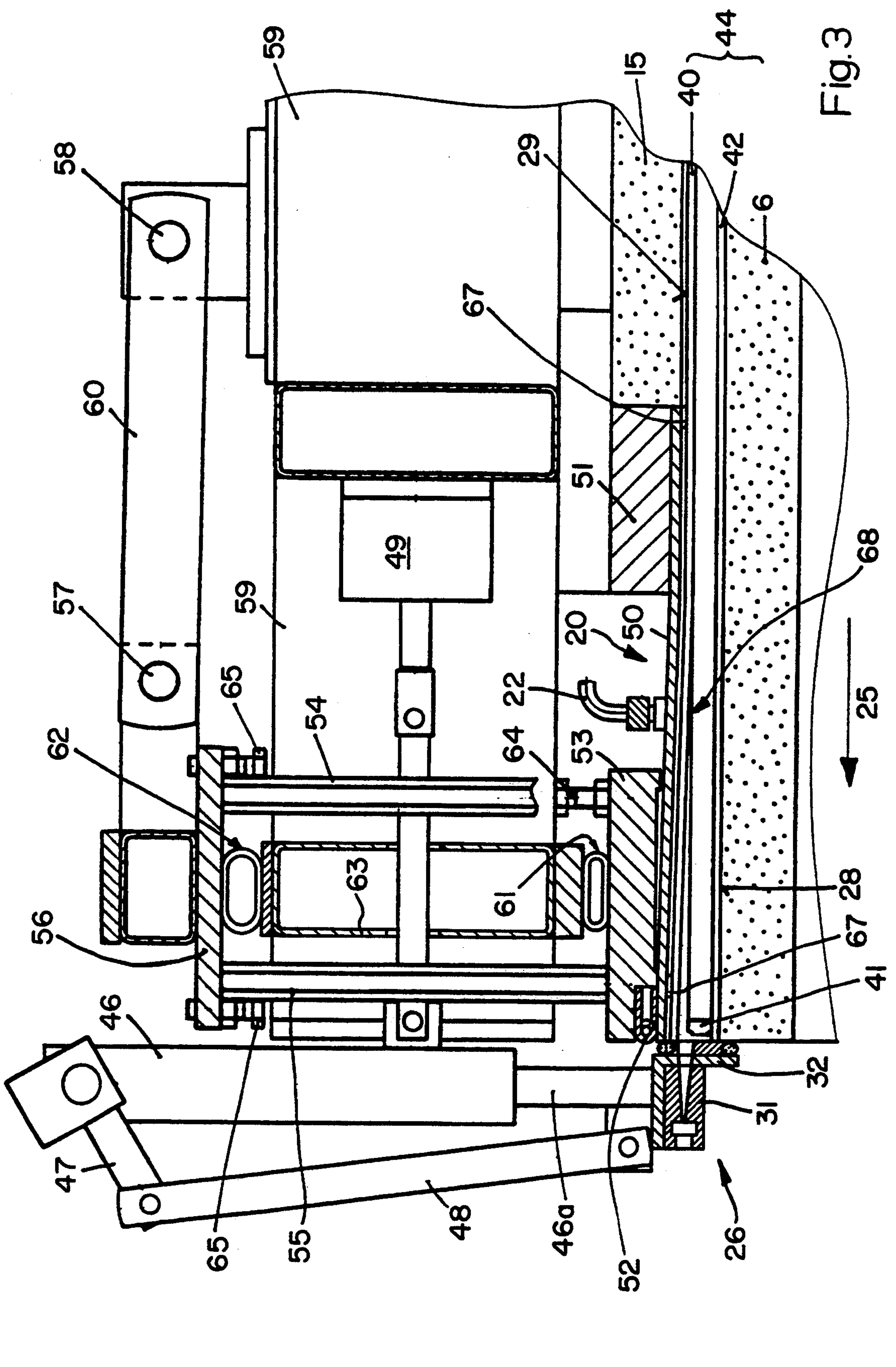
FIG. 3 is a transverse sectional view taken on line III—III and showing as a detail a portion of the apparatus with an insulating glass pane in which one glass plate has been flexed.
Figure 4:
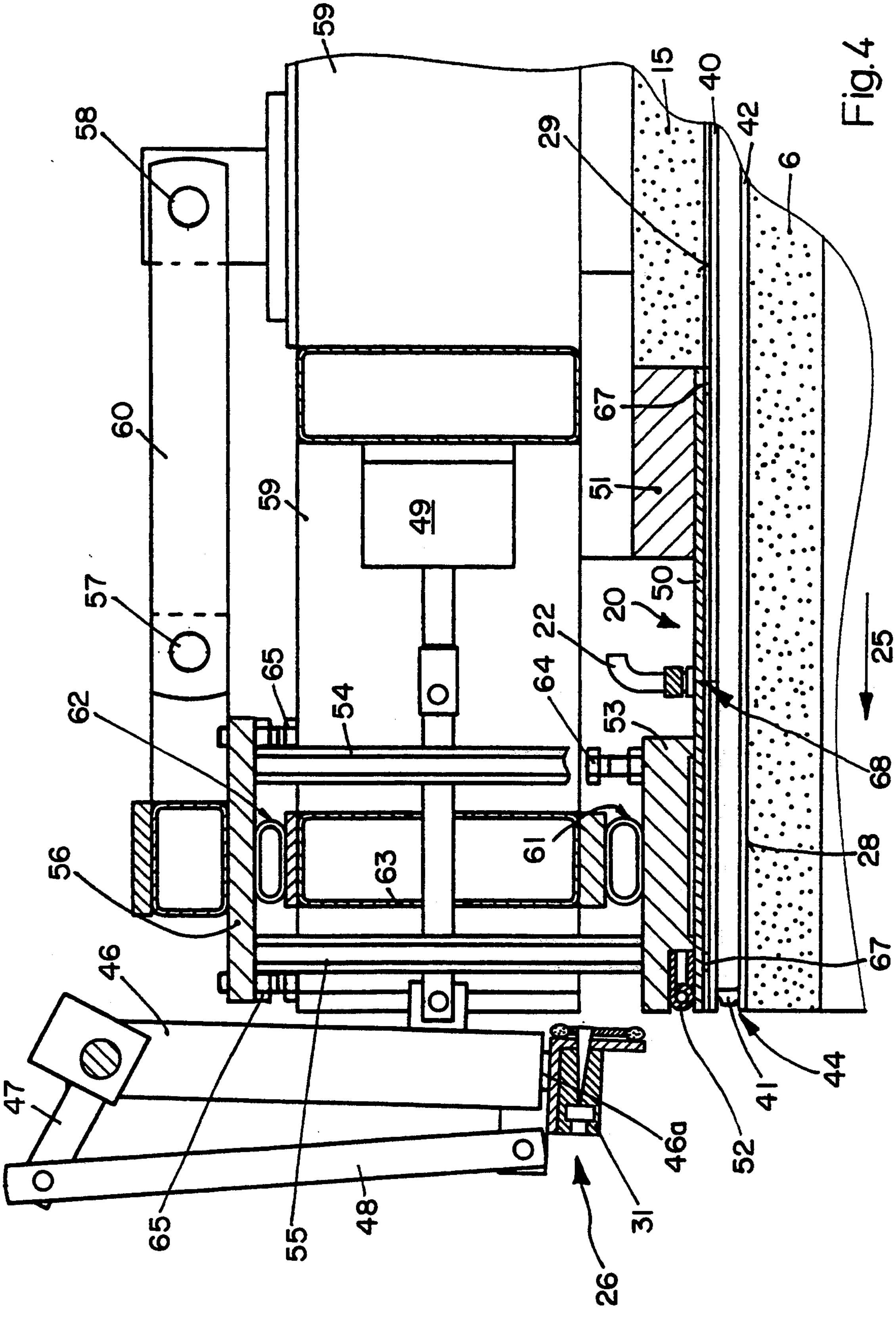
FIG. 4 is like FIG. 3 a sectional view showing the apparatus but in the position in which the insulating glass pane is closed.

As is apparent from FIGS. 3 and 4 the suction device 20 comprises a sheet metal element 50, particularly a steel plate, which has a thickness of 4 to 5 mm. That sheet metal element adjoins the delivery edge of the wall 15, which is formed with bores and on which the glass plate 40 to be flexed is retained by suction. The sheet metal element 50 extends from the bottom corner to the top corner of the wall 15, which at its delivery-side edge is rigidly connected to a metal plate 51, which has a forward surface that is set back from the forward surface of the wall 14. The sheet metal element 50 is fixedly connected to the forward surface of the metal plate 51 and in the direction of conveyance 25 protrudes beyond the metal plate 51. As a result, the sheet metal element 50 is unilaterally gripped on one side and is thus attached to the delivery-side edge of the wall 14. Because the sheet metal element 50 is gripped on one side, it can be deflected transversely to its surface by resilient flexing. For that purpose a plate 53 is hinged by a hinge 52 to the delivery-side edge of the sheet metal element 50 and that plate 50 is connected on its rear side to another plate 56 by struts 54 and 55, which extend at right angles to the surface of the plate 53. As a result, the plates 53 and 56 and and the struts 54 and 55 constitute a frame, which is movable forwardly and rearwardly parallel to itself and to the forward surface of the wall 15. The parallel guidance of the frame is ensured by a fourbar linkage, which comprises the means gripping of the sheet metal element 50 on the metal plate 51, the hinge 52 and two suitably spaced apart pivots 57 and 58 disposed behind the plate 56. The pivot 57 is fixed to the plate 56 and the pivot 58 is fixed to the base frame of the wall 15. The two pivots 57 and 58 are connected by a link 60.

The mechanism for displacing the frame 53 to 56 comprises two inflatable hoses 61 and 62. The hose 61 is disposed between the plate 53 and the forward surface of a column 63, which extends between the plates 53 and 56 and belongs to the base frame 59 and is thus rigid with the frame. The hose 62 extends between the plate 56 and the rear surface of the columns 63.

When the rear hose 62 is inflated and the forward hose 61 is vented (FIG. 3), the plate 53 will be retracted until an adjustable stop 64 on the plate 53 strikes against the base frame 59. The delivery-side edge of the sheet metal element 50 is retracted together with the plate 53 and the sheet metal element 50 is thus flexed (FIG. 3). When both hoses 61 and 62 are vented, the sheet metal element 50 will resiliently return to its initial position, in which its coated forward surface is flush with the positioning surface 29. If the forward hose 61 is inflated too, the sheet metal element 50 will be stabilized in its position and adjustable stops 65, which are provided on the rear plate 56, will strike against the base frame 59 to ensure that the forward surface of the suction device 20 will not be advanced beyond the positioning surface 29.

Figure 5:
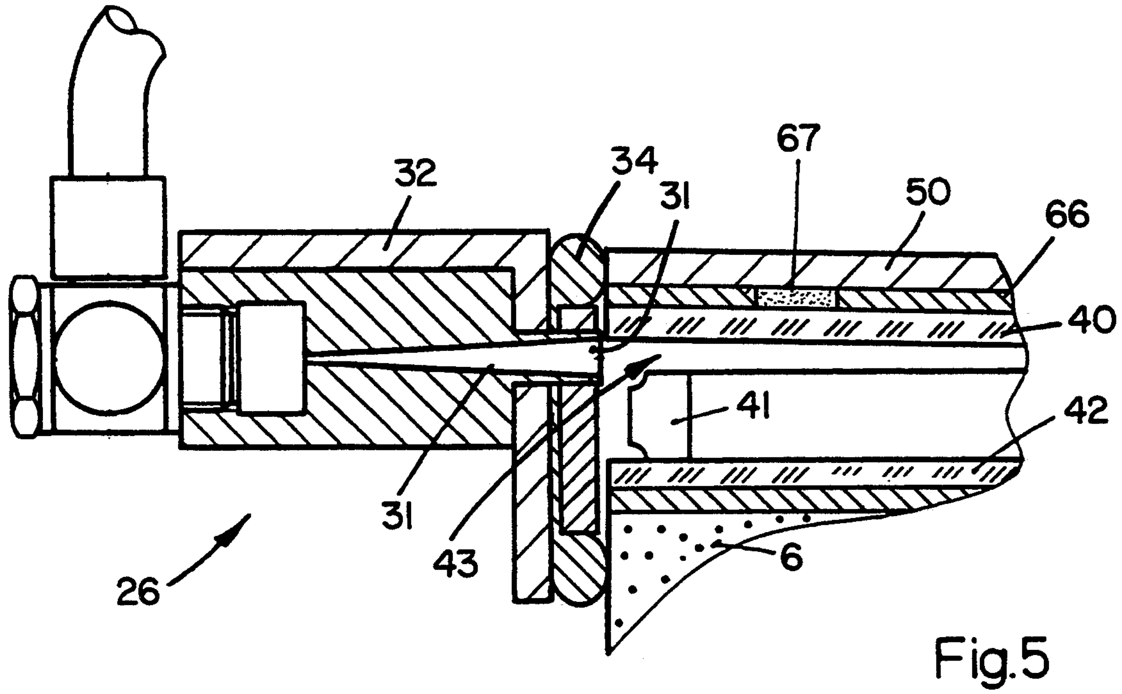
FIG. 5 is an enlarged representation of the region of the filling nozzle as a detail of the sectional view of FIG. 3.

The forward surface of the sheet metal element 50 is provided with a layer 66 made of an elastomeric material, particularly of rubber (see FIG. 5). Striplike compressible seals, e.g., of expanded rubber, are embedded in the layer 66 to subdivide and limit the individual suction cups 21. Said striplike seals 67 impart to each suction cup a rectangular outline, at the center of which a suction opening 68 is disposed (FIG. 2). The striplike seals 67 protrude over the forward surface of the layer 66 and are compressed as a glass plate 40 is sucked.

Figure 8:
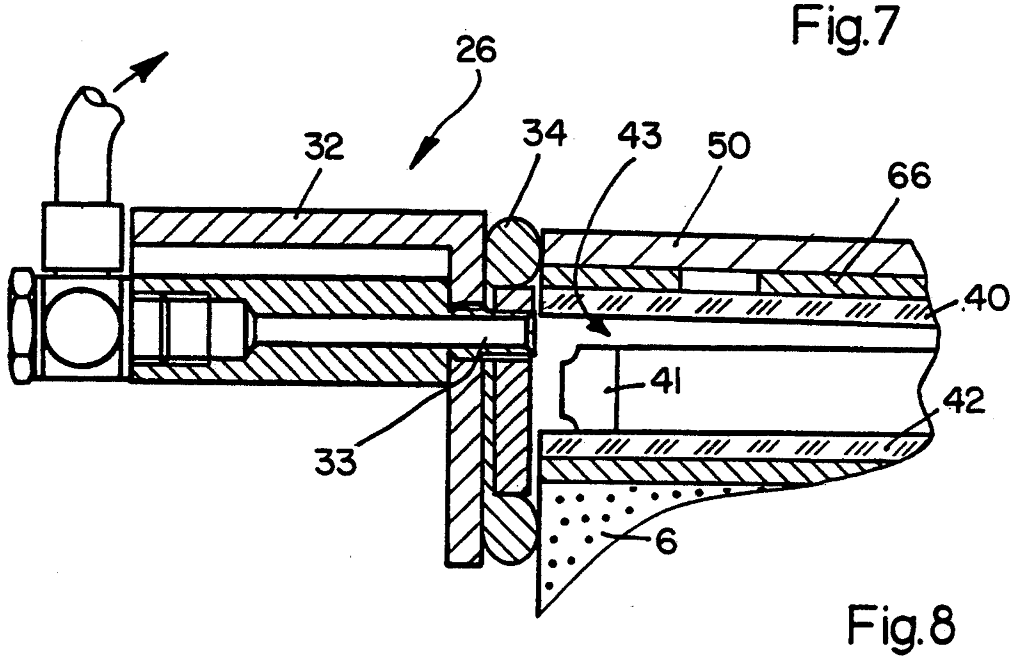
FIG. 8 is a transverse sectional view showing as a detail the covering element on the level of a suction passage.

As the plate 50 is bent, a glass plate 40 sucked to the plate 50 is bent in unison therewith so that a gap 43 is formed in an insulating glass pane 44 that is disposed between the air cushion wall 6 and the wall 15. That gap 43 is disposed at the delivery-side edge of the insulating glass pane 44 (see FIGS. 3 and 5). A gas other than air, particularly a heavy gas, is intended to be blown through that gap 43 into the interior space of the insulating glass pane in order to displace the air from the interior space. The means for feeding the gas consist of a nozzle 31, which is engaged with the delivery-side edge of the insulating glass pane 44 near its lower corner. The nozzle 31 is provided on an elongate angle bar 32, which serves to cover the entire deliver y-side-edge of the insulating glass pane 44 and above the nozzle 31 contains a row of regularly spaced apart suction nozzles 33 (see FIGS. 1 and 8).

The forward surface of the angle bar 32 is covered by a seal 34, which is caused to engage the delivery-side edge of the plate 50 on one side and the delivery-side edge of the air cushion wall 6 on the other side.

Figure 7:
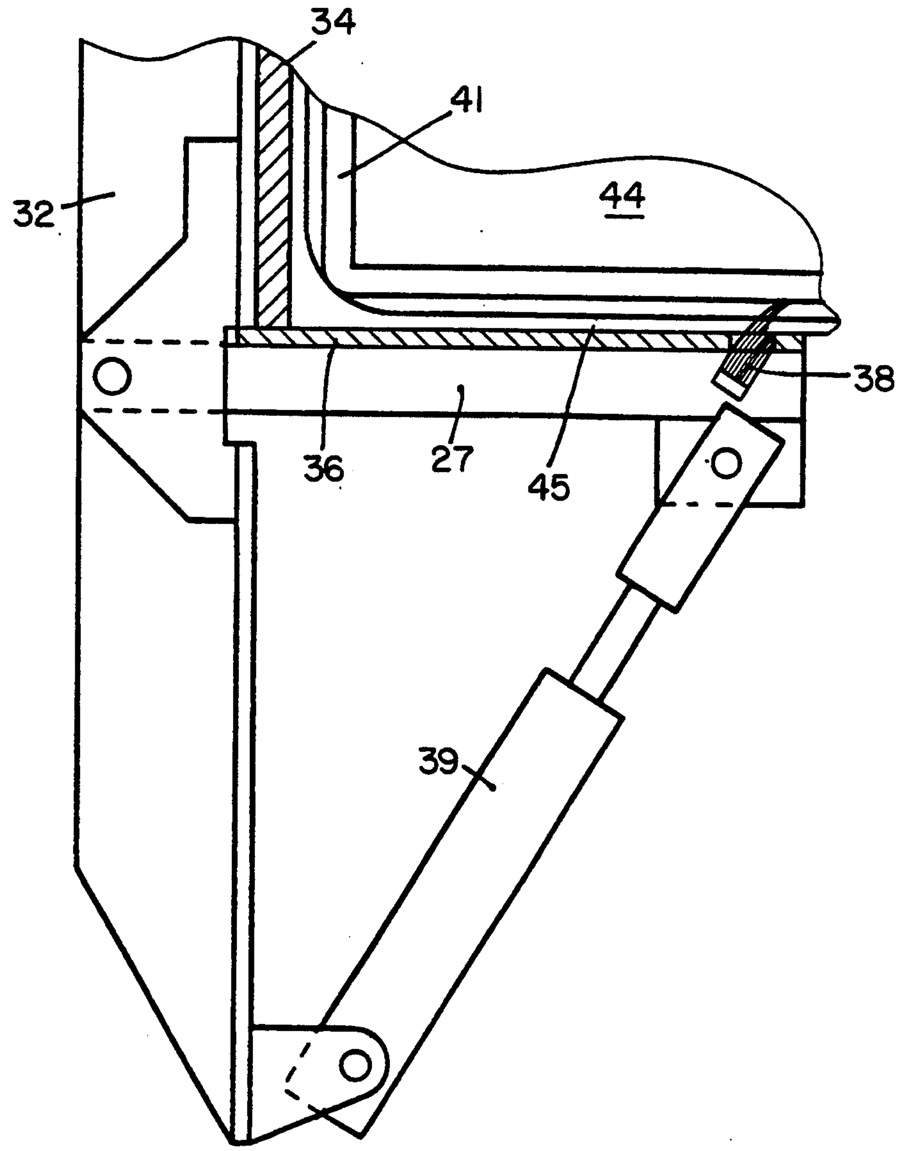
FIG. 7 shows as a detail the bottom end of a sealing element for the insulating glass pane and a short covering bar, which is pivoted to that bottom end.

A short covering bar 27 is pivoted to the angle bar 32 on the level of the set of rollers 3 and on its top side carries a striplike seal 36, which is intended to engage the bottom edge of the insulating glass pane 44 (see FIGS. 2 and 7). It is intended thus to seal the wedge-shaped gap which forms at the bottom edge of the glass plate 40 as it is flexed. To prevent the introduced gas from escaping along the spacer 41 through the edge gap 45 of the insulating glass pane, a brush 38 is provided at the end of the covering bar 27 and the bristles of that brush enter the edge gap when the covering bar 27 is engaged with the bottom edge of the insulating glass pane 44. A fluid-operable cylinder 39 is provided for pivoting the covering bar 27.

To permit a conveyance of the insulating glass pane in the direction of conveyance 25 out of the apparatus, it must be possible to move the covering element 26 out of the path of conveyance. Fluid-operable cylinders 46 are provided for that purpose and engage the angle bar 32 in order to move it forwardly and rearwardly (see FIGS. 3 and 4). Links 47 and 48 are pivoted to the fluid-operable cylinder 46 and to the angle bar 32, respectively, and ensure a synchronized movement of the angle bar as it is moved forwardly and rearwardly. The fluid-operable cylinders 46 are displaceable in and opposite to the direction of conveyance by one or two pressure fluid cylinders 49, which are mounted on the base frame 59.

Figure 6:
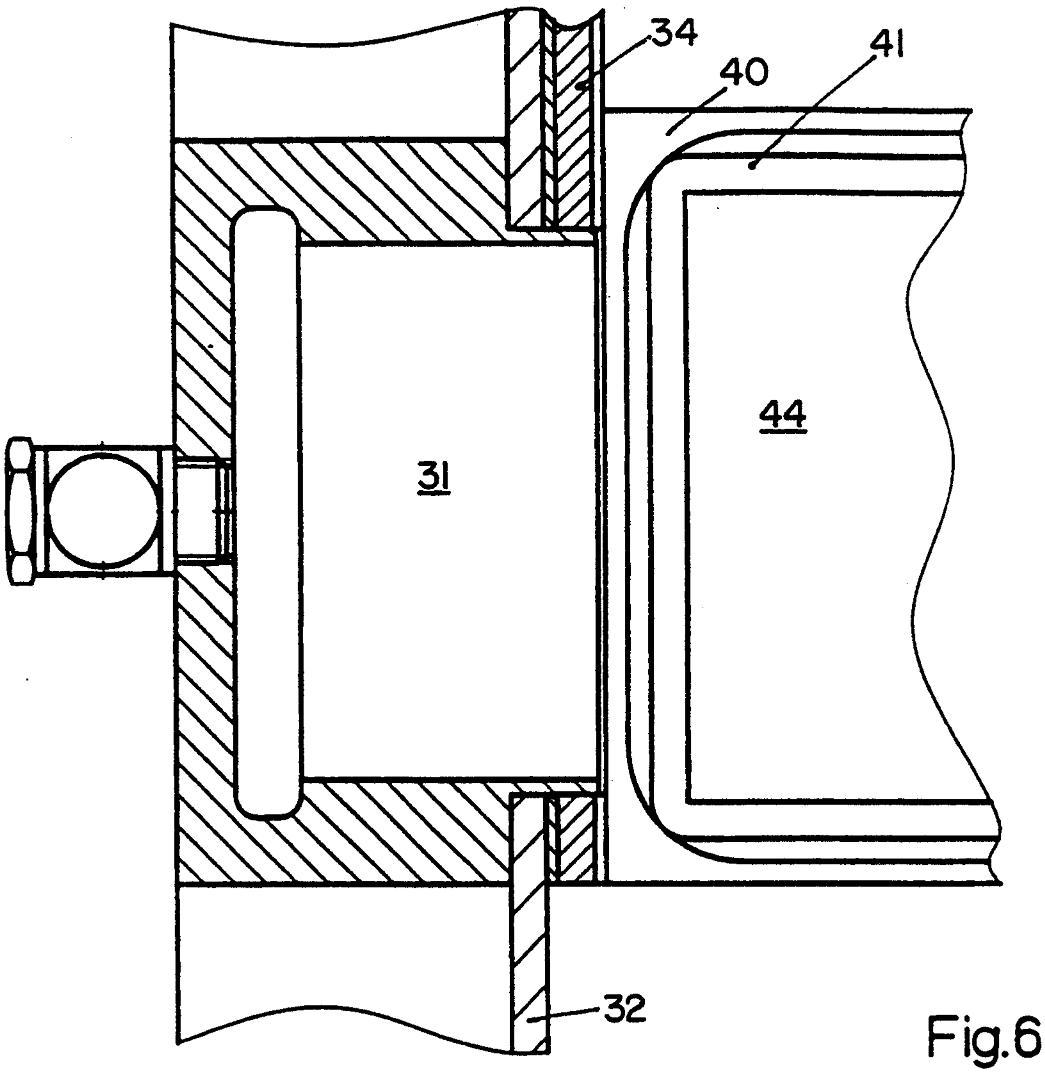
FIG. 6 is a vertical sectional view taken on section line VI—VI in FIG. 5 and shows the filling nozzle as a detail.

As is shown in FIG. 6 the nozzle 31 for supplying the gas is provided with a flat, elongate mouth, through which a correspondingly flat jet can be directed into the interior space of the pane. FIG. 6 shows the nozzle in engagement with a very small insulating glass pane. The height of the nozzle orifice should be less than the height of the smallest insulating glass pane that is to be processed.

The apparatus operates as follows:

When the lifting beams 5 and 18 have been lowered, a glass plate 40, which stands on the rollers 3 and leans against the backing wall 6, is transported into the apparatus. The position, length and height of the glass plate 40 are detected in known manner by sensors.

The glass plate 40 is conveyed as far as to the delivery-side edge of the backing wall 6 and is arrested when it is flush with the edge of that wall.

The lifting beam 3 is then raised to lift the glass plate 40 from the rollers 3. Thereafter the wall 15 is moved towards the glass plate 40, and the angle bar 32 along, which is attached to the end of the piston rod 46*a* of the fluid-operable cylinder 46 and has been advanced before, is moved in unison with the wall 15 until the angle bar engages a fixed stop, which is not shown and is mounted on the underframe 1. As the forward movement of the wall 15 is continued, the piston rod 46*a* is pushed into the fluid-operable cylinder 46 until the wall 15 engages the glass plate 40. In that position, which is a measure of the thickness of the glass plate 40, the piston rod 46*a* is arrested in the fluid-operable cylinder 46. The glass plate 40 is then sucked in that air is sucked through the bores 35 in the wall 15, and the glass plate 40 is moved back together with the wall 15 as the glass plate is suspended on the wall 15 and is supported at its bottom edge by the supports 19, which have been raised in the meantime. At the time of the suction effected through the bores 35 and in no case later than now are those suction cups 21 activated which are entirely covered by the glass plate 40. That activation is controlled, e.g., by a sensor, which determines the height of the glass plate 40. Said suction cups additionally suck the glass plate 40. When the sucking suction cups firmly engage the outside surface of the glass plate 40, the plate 50 on which they are provided is flexed away from the backing wall 6 and the glass plate 40 is flexed to the same extent.

During that time the supports 4 are lowered and another glass plate 42, which has the same size but is provided with a spacer 41, is conveyed to a position in which it is in register with the glass plate 40, and is then lifted from the rollers 3 by the supports 4. The spacer 41 is coated with an adhesive on both sides.

The wall 15 is then approached to the wall 6 until the glass plate 40 (which is the "second" glass plate in the language of claims) engages the spacer 41. As a result, the space between the two glass plates 40 and 42 is closed with the exception of a gap 43 extending along the delivery-side edge of the glass plate 40. The fluid-operable cylinder 49 is then operated to move the covering element 26 into engagement with the delivery-side edge of the insulating glass pane (FIG. 3) and the fluid-operable cylinder 39 is then operated to move the covering bar 27 into engagement with the bottom edge of the insulating glass pane 44. Because the piston rod **46*a* is arrested, one edge bead of the seal 34 will engage the edge of the sheet metal element 50 always in the same position regardless of the thickness of the glass plate 40**.

The gas is subsequently introduced through the nozzle 31 into the insulating glass pane 44 to displace upwardly the air contained in said pane. Under the control of a sensor which is responsive to the height of the insulating glass pane the first suction nozzle 33 is activated, which is disposed above the insulating glass pane and sucks at least part of the displaced air and/or of the displaced air-gass mixture and conducts it to a sensor, not shown, which detects the residual oxygen content in the air-gas mixture which has been sucked. When the residual oxygen content has decreased below a predetermined value the introduction of gas is terminated and the insulating glass pane is closed in that the suction device 20 is pressure-relieved (so that the glass plate 40 resiliently moves against the spacer 41 to close the insulating glass plate very quickly) or in that the rear hose 62 is pressure-relieved (in that case the glass plate 40 resiliently moves somewhat more gently against the spacer 41). The insulating glass pane 44 can then be compressed in the apparatus so that the adhesive joint between the spacer 41 and the two glass plates 40 and 42 is rendered gastight and the insulating glass plate assumes its desired thickness. To that end the wall 15 and the suction device secured to that wall are pulled by the fluid-operable cylinders 13 against the backing wall 6. To prevent the flexible suction device 20 to yield to the pressure applied, the hose 61 is inflated at the same time in order to support the suction device 20 on the rear.

During that phase the covering element 26 is no longer needed and is moved out of the path of conveyance to its retracted end position shown in FIG. 4 in that the covering bar 27 is swung down and a combined movement is imparted to the covering element 26 in the direction of conveyance and transversely thereto.

After the compressing, the wall 15 is moved away from the backing wall 6, the supports 4 and 19 are lowered, and the insulating glass pane 44 is carried away while it stands on the rollers 3 and leans against the air cushion wall 6.

INDUSTRIAL UTILITY

The process in accordance with the invention and the apparatuses in accordance with the invention are intended and suitable for use in the manufacture of insulating glass panes.

We claim:

1. A process of assembling insulating glass panes, wherein an interior space is provided between pairs of glass plates, which are spaced apart and adhesively joined along their edges by a framelike spacer and which during their assembling are in contact on their outside planar surfaces with positioning surfaces, and wherein said interior space is filled with a gas other than air, in that at least one of the glass plates is elastically flexed along an edge of the glass plate, the spacer is attached to one of the glass plates (hereinafter called the "first" glass plate) before or during or after the flexing of one of the glass plates, the spacer is attached to the other glass plate (hereinafter called the "second" glass plate) while the flexing is maintained to create and to keep open an access opening to the interior space between the glass plates, the gas is admitted to the interior space through the access opening thus provided, and the access opening is closed in that the resilient flexing is eliminated, characterized in that at least one glass plate together with its respective positioning surface contacting it is flexed so that the outside surface of the glass plate is concave.

2. A process of assembling insulating glass panes, wherein an interior space is provided between pairs of glass plates which are spaced apart and adhesively joined along their edges by a framelike spacer and which during their assembling are in contact on their outside surfaces with positioning surfaces, and wherein said interior space is filled with a gas other than air, the spacer is attached to one of the glass plates (described hereinafter as the "first" glass plate) and subsequently to the other glass plate (described hereinafter as the "second" glass plate), at least one of the glass plates is resiliently flexed along an edge of the glass plate to provide an access opening to the interior space between the glass plates, a gas is introduced into the interior space through the access opening thus provided, and the resilient flexing is eliminated to close the access opening, characterized in that at least one glass plate together with its respective positioning surface contacting it is flexed so that the outside surface of the glass plate is concave.

3. A process according to claim 1, characterized in that the glass plate to be flexed is sucked to its respective positioning surface.

4. A process according to claim 1, characterized in that only one of the glass plates is flexed.

5. A process according to claim 1, characterized in that only the second glass plate is flexed.

6. A process according to claim 5, characterized in that the second glass plate is flexed before it is joined to the spacer.

7. A process according to claim 1, characterized in that the access opening to the interior space between the two glass plates is partly sealed at the edges of the glass plates during the introduction of the gas.

8. A process according to claim 3, characterized in that the second glass plate concerned is sucked in a striplike partial region of its outside surface, which region extends on the marginal portion of the second glass plate substantially from one corner of the second glass plate to the other.

9. A process according to claim 1, characterized in that the gas is introduced into the interior space between the two glass plates while they stand upright or are inclined and that the gas is introduced from below and displaces the air upwardly. and that the gas is introduced from below and displaces the air upwardly.

10. An apparatus for assembling insulating glass wherein an interior space is provided between pairs of glass plates (40, 42), which are spaced apart and adhesively joined along their edges by a framelike spacer (41) and wherein said interior space is filled with a gas other than air, comprising backing means (6) for supporting and positioning the glass plates (40, 42), retaining means (15), which are parallel to the backing means (6) and arranged at a variable distance therefrom and serve to retain and position one of the glass plates (40) at a distance from the other glass plate (42), wherein either the backing means (6) or the retaining means (15) or both define a positioning surface (29), which is intended to contact the outside surface of one glass plate (40) and in which the forward surface of an elongate suction device (20) is disposed, which is directed toward the glass plate (40), and means (31) for supplying the gas, characterized in that the suction device (20) is arranged on the positioning surface (29) in a resiliently deflectable portion thereof, which is attached to the retaining means (15) and/or to the backing means (6), and said portion is engaged by a pulling and/or pushing means (52 to 56) for flexing the portion.

11. An apparatus according to claim 10, characterized in that the resiliently deflectable portion is a marginal portion of the retaining means (15) and/or of the backing means (6).

12. An apparatus according to claim 10, characterized in that the retaining means (15) are a wall provided with means (35) for holding the one glass plate (40) in position.

13. An apparatus according to claim 10, characterized in that for processing glass plates (40, 42) standing on edge the backing means (6) extend above a horizontal conveyor (3) and are slightly rearwardly inclined to support the glass plates (40, 42) standing on the conveyor, and that the means (31) for supplying the gas are arranged on the level of the conveyor (3) or above the conveyor (3) at a variable distance from the conveyor (3).

14. An apparatus according to claim 12, characterized in that the holding means of the wall (15) consist of suction means (35).

15. An apparatus according to claim 10, characterized in that a row consisting of a plurality of suction cups (21) is arranged in the elongate suction device (20).

16. An apparatus according to claim 13 characterized in that the row of suction cups (21) extends at right angles to the direction of conveyance (25).

17. An apparatus according to claim 15, characterized in that the suction cups (21) directly adjoin each other.

18. An apparatus according to claim 15, characterized in that the suction cups (21) are adapted to be activated individually or in groups.

19. An apparatus according to claim 10, characterized in that the backing means (6) consist of an air cushion wall having openings through which the air can selectively be blown or sucked.

20. An apparatus according to claim 10, characterized in that the means (31) for supplying the gas have an elongate mouth (37), which is intended to engage the edges of the glass plates (40, 42) or the edge of one glass plate (40) and the spacer (41).

21. An apparatus according to claim 10, characterized in that exhausting means (33) are provided, which are intended to engage the edges of the glass plates (40, 42) or the edge of one glass plate (40) and the spacer (41).

22. An apparatus according to claim 20, characterized in that a covering element is provided, which serves to obstruct the escape of gas from the interior space between the glass plates and by which an access opening that forms along the edge when the glass plate has been deflected and is covered throughout its length, and the means for supplying the gas and the exhausting means are both integrated in said covering element.

23. An apparatus according to claim 22, characterized in that a row of exhaust openings, which are adapted to be activated individually or in groups, are provided in the covering element.

24. An apparatus according to claim 22, characterized in that a short covering bar is pivoted to the covering element at one end thereof and in its effective position extends at right angles to the covering element.

25. An apparatus according to claim 10, characterized in that the suction device comprises a sheet metal element, which has suction openings and is unilaterally gripped at a delivery-side end of the retaining means and on its forward surface which faces the glass plate to be flexed and carries a layer of an elastomeric material and close to its delivery-side edge is engaged on its rear surface by pulling and/or pushing means.

26. An apparatus according to claim 25, characterized in that the pulling and/or pushing means (52 to 56) articulatedly engage the sheet metal element (50).

27. An apparatus according to claim 25, characterized in that the flexing behavior of the sheet metal element (50) is adapted to that of the glass plate (42).

28. An apparatus according to claim 27, characterized in that the sheet metal element is a steel plate, which is 4 to 5 mm thick.

29. A process according to claim 2, characterized in that the glass plate (40) to be flexed is sucked through the positioning surface (29) against the positioning surface (29).

30. A process according to claim 2, characterized in that only one of the glass plates (40, 42) is flexed.

31. A process according to claim 2, characterized in that the access opening to the interior space between the two glass plates (40, 42) is partly sealed at the edges of the glass plates (40, 42) during the introduction of the gas.

32. A process according to claim 29, characterized in that the glass plate (40) concerned is sucked in a striplike partial region of its outside surface, which region extends on the marginal portion of the glass plate (40) substantially from one corner of the glass plate (40) to the other.

33. A process according to claim 2, characterized in that the gas is introduced into the interior space between the two glass plates (40, 42) while they stand upright or are inclined and that the gas is introduced from below and displaces the air upwardly.

* * * * *